United States Patent Office 2,975,583
Patented Mar. 21, 1961

2,975,583

SIDE DELIVERY RAKE

Cornelis van der Lely and Ary van der Lely, both of Maasland, Netherlands, assignors to C. van der Lely N.V. Manufacturers, Maasland, Netherlands, a Dutch limited company Filed Aug. 19, 1957, Ser. No. 678,896

Claims priority, application Netherlands Aug. 21, 1956

9 Claims. (Cl. 56—377)

This invention relates to agricultural devices of the kind comprising a frame which is supported by at least two ground wheels which are spaced apart from one another, and each of which is rotatable about a substantially vertical axis, the frame being provided, at two different locations with draw-members on which a tractive force can be exerted to move the device. The invention is particularly concerned with devices of the kind set forth which are adapted laterally to displace crop or the like material lying on the ground, such as, for example, side delivery rakes.

With known devices of the kind set forth, a first ground wheel is connected to a draw-bar, so that the direction of the tractive force determines the position of the wheel, whereas locking means is provided for preventing a second ground wheel from turning about its vertical axis. When the tractive force is exerted at a different location, the second ground wheel is provided with a draw-bar and the locking means which prevented this wheel from turning about its vertical axis, is released, and the first ground wheel is locked.

The invention has for its object to omit the locking means for the ground wheels so that it is possible to minimise the number of manipulations required for applying the tractive force to a different location.

In accordance with the invention there is provided an agricultural device of the kind set forth, wherein two of the ground wheels are coupled together by coupling members which are movable relative to the frame, the arrangement being such that, when the direction of the tractive force is changed, each ground wheel is turned about its substantially vertical axis. If desired, also three or more ground wheels may be coupled in this way.

With this construction, when the tractive force is applied to a different draw-member and the device is moved in a different direction, there is no need for the ground wheels to be locked. It is a further advantage that the device can be easily controlled when turning corners and that even sharp corners can be easily taken.

Figure 1:
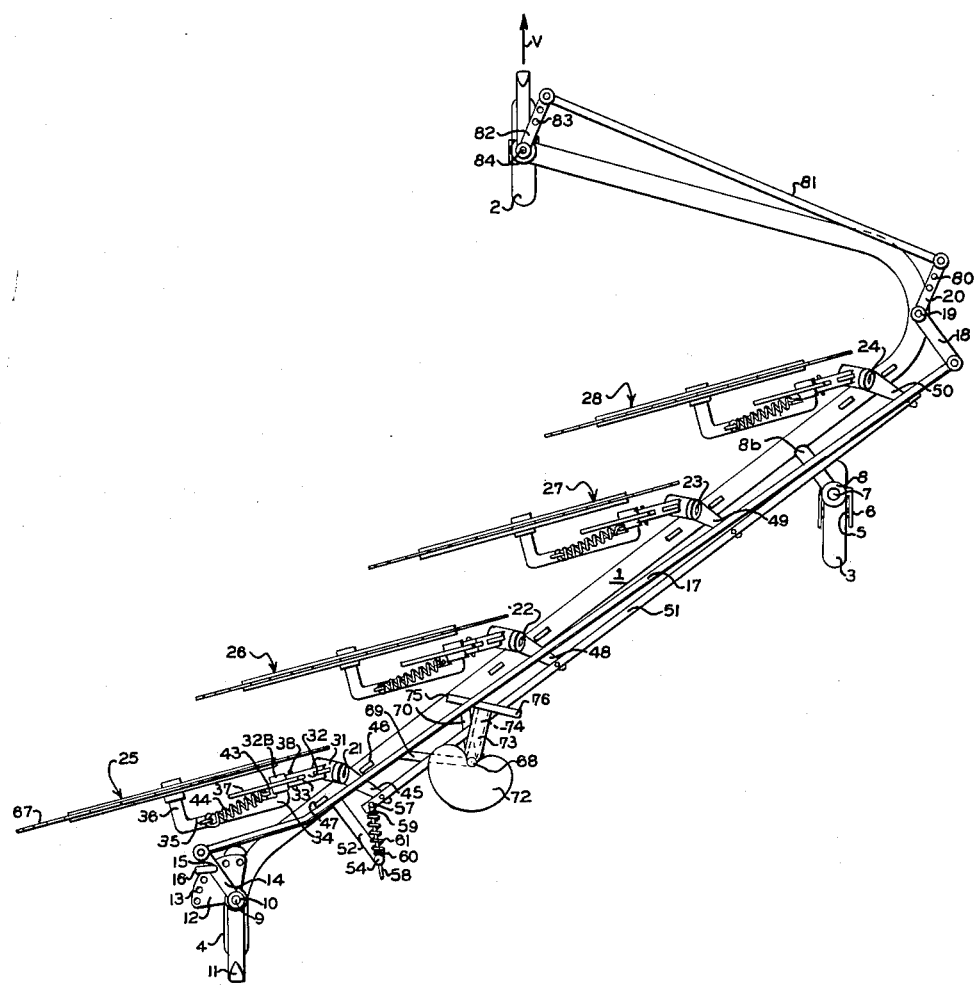
Figure 2:
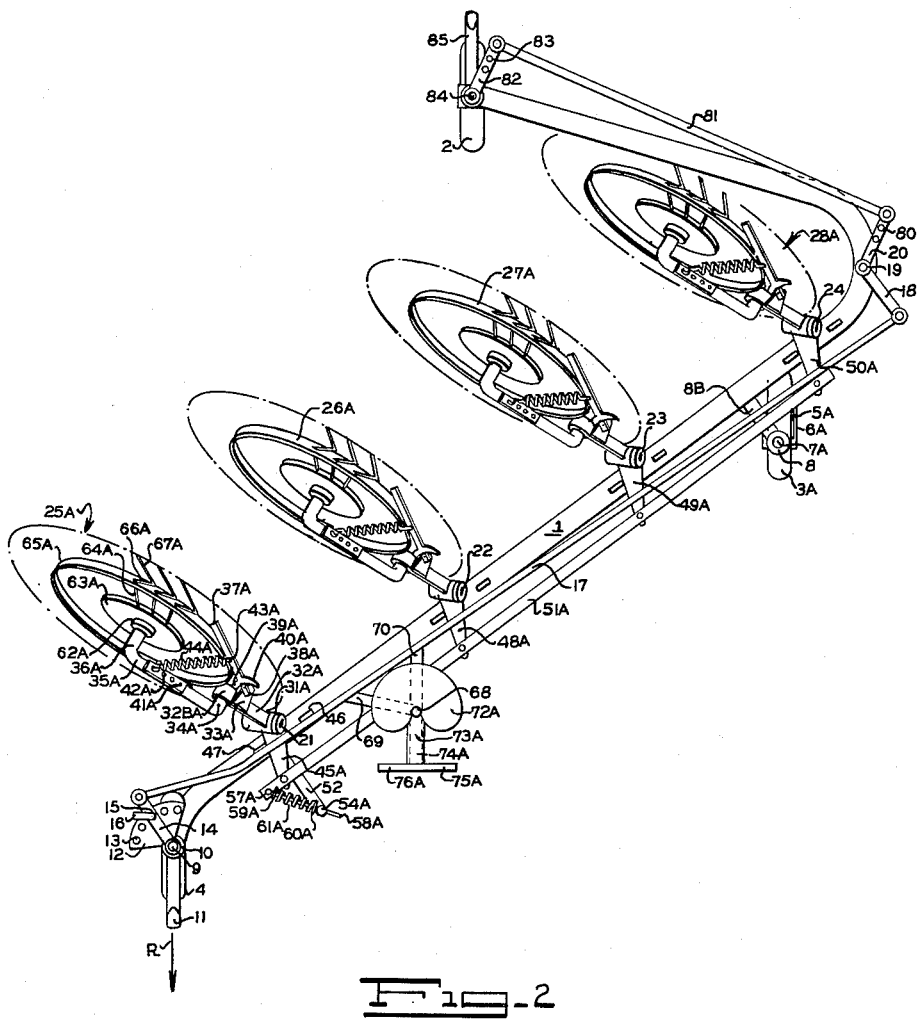

For a better understanding of the invention, and to show how the same may be carried into effect, reference will now be made to the accompanying drawings, in which:

Figure 1 is a plan view of a device for laterally displacing crop lying on the ground, the device being shown in a first working position, and Figure 2 is a plan view of the device shown in Figure 1, but in a second working position.

Referring now to Figures 1 and 2 there is shown a device for laterally displacing crop lying on the ground, the device being shown in Figure 1 in a first working position in which it is arranged to operate as a side delivery rake and the device being shown in Figure 2 in a second working position in which it is arranged to operate as a tedder. The same reference numerals are employed in Figures 1 and 2 to denote the same parts, but the reference numerals of Figure 2 denote parts which occupy a different position from that shown in Figure 1 are differentiated by the suffix A.

The device comprises a main frame member or mobile frame 1, which is supported by three ground wheels 2, 3 and 4 and has the shape of a "seven". The ground wheel 3 is rotatable about its horizontal axle 5, which is connected to a vertical shaft 7 by means of a fork 6. The axis of the shaft 7 does not intersect the axis of the axle 5, so that the ground wheel 3 is a caster wheel, and the vertical shaft 7 is journalled in a bearing 8, which is connected to the frame member 1 by means of an arm 8B. The ground wheel 4 is also rotatable about its horizontal axle, which is connected to a vertical shaft 9 by means of a fork. The vertical shaft 9 is journalled in a bearing 10, which is secured to one end of the frame beam 1, and the axis of the shaft 9 does not intersect the axis of rotation of the wheel 4. A draw hook 11, by means of which the machine can be moved is rigidly secured to the shaft, and a segment 12, which is formed with holes 13, is also rigidly secured to the shaft 9.

An arm or lever 14 is rotatable about the shaft 9, the arm 14 being formed with a hole 15, and a locking pin 16 can be passed through the hole 15 and a registering one of the holes 13 in order to prevent rotation of the arm 14 about the shaft 9.

One end of a coupling rod or lever 17 is pivotally linked to the free end of the arm 14, and the other end of the coupling rod 17 is pivotally linked to one end of an arm or lever 18, which is rotatable about a shaft 19 rigidly secured to the frame member 1. An arm or lever 20 is rigidly secured to the arm 18, the arm 20 also being rotatable about the shaft 19, and being formed with holes 80. The arm 20 is pivoted to a coupling rod or lever 81, one end of which can be introduced into one of the holes 80 and the other end of which can be introduced into one of a number of holes 83 formed in an arm 82 (and constituting adjustment means) in such a way as to be pivotable relative to the arm or lever 82. The arm 82 is rigidly secured to a vertical shaft 84, which is connected to the horizontal axle of the ground wheel 2. A draw-hook 85 is rigidly secured to the shaft 84, and the tractive force required to move the device can be exerted on the draw-hook 85.

Oblique shafts 21 to 24 are secured to the frame member 1 in such a way that the major part of the frame member 1 lies behind them, and rake wheels 25 to 28 are connected one to each oblique shaft. The shaft 21 is rigidly secured to the frame member 1, and a bearing 31 is rotatable about the shaft 21, the bearing 31 carrying an arm 32. The arm 32 has a bearing 32B, in which the shaft 34 of a crack 35 is journalled, the other end of the crank 35 constituting a shaft 36 for the rake wheel 25. A lug 33 is secured to the arm 32 and, at the top of the lug 33 a lever 37 is mounted so as to be rotatable about a shaft 38. The lever 37 is provided with stops (see 39A and 40A in Figure 2), which limit rotation of the lever 37 about the shaft 38, since either stop can bear against the lug 33. A strip 41 is secured to the crank 35, and is formed with a row of holes (see 41A and 42A in Figure 2). The lever 37 carries an eye 43, and a draw spring 44 extends between one of the holes 42 and the eye 43. The bearing 31 is furthermore provided with an arm 45, and stops 46 and 47 are provided on the frame member 1, the arm 45 being arranged between the stops 46 and 47 which serve to limit rotation of the arm 45 about the shaft 21, and thereby to limit rotation of the rake wheel 25 about the shaft 21. The rake wheels 26 to 28 are connected to the shafts 22 to 24 in the same way as the rake wheel 25 is connected to the shaft 21. In order to limit rotation of each of the rake wheels 26, 27 and 28 about their shafts 22, 23 and 24, arms 48, 49 and 50 (similar to the arm 45) are provided for the rake wheels 26, 27 and 28 in conjunction with further stops 46 and 47 provided on the frame member 1 and the arms 45, 48 and 49, 50 are inter-connected by a strip 51.

An arm 52 is secured to the frame member 1, and a shaft 54 is rotatably mounted on the free end of the arm 52, the shaft 54 being formed with a hole, through which a rod 58 passes so as to be freely movable in the hole. The rod 58 is rotatably connected at the point 57 to the strip 51, and is provided with a collar 59, which is rigidly secured to the arm 58. The arm 58 furthermore carries a collar 60, which is slidable along the arm 58, a pressure spring 61 being arranged between the collar 59 and the collar 60.

The rake wheels 25, 26, 27 and 28 are constructed in the same manner so that it will suffice to describe the rake wheel 25 in detail. The rake wheel 25 comprises a hub 62 (see Figure 2), which is provided with a disc 63, and spokes 64 are secured to the disc 63, the spokes 64 passing through holes in a hoop or rim 65. Beyond the rim 65 the spokes 64 are bent to form portions 66 which, in turn, are bent to form tines 67. The spokes 64, the portions 66 and the tines 7 are integral with one another and are rotatable in the rim 65, so that the spokes 64 constitute, in effect, torsion bars for the tines 67.

A vertical bearing 68 is secured to the frame member 1 by means of two arms 69 and 70, and a seat 72 is rotatably arranged in the bearing 68 by means of a strip 73, to which is secured an arm 74, which is provided with foot-rests 75 and 76.

In the operation of the device in the working position shown in Figure 1, the device is moved in the direction of the arrow V by pulling on the draw hook 85. In the working position shown in Figure 1, the device is arranged to operate as a side delivery rake, the rake wheels 25 to 28 being rotated by coming into contact with the ground and/or materially lying thereon, and delivering the crop to one side, leaving it at the side of the rake wheel 25. During the movement of the device, lateral forces will be exerted thereon, which are to be taken up by the ground wheels. Only the ground wheels 2 and 4 are capable of taking up these forces, since the ground wheel 3 is a caster wheel. The ground wheels 2 and 4 are capable of withstanding these forces, since the axes of their vertical shafts do not intersect the axes of their horizontal axles, while they are coupled with the draw hook 85, which determines their positions. Consequently, it is not necessary to lock one of the wheels, and since the ground wheels 2 and 4 are coupled to one another, they will turn about their vertical shafts in opposite directions when the device travels round corners and the direction of the tractive force changes; the implement can thus travel easily round sharp corners. Such a construction is, moreover, very important with a device comprising rake wheels which are rotated by their contact with the ground, since, with such a construction, the rake wheels will maintain their oblique positions, during the movement of the device around a corner, with respect to the instantaneous direction of movement, so that even when moving the device around the corner the crop can be delivered sideways in satisfactory manner. By connecting the coupling rod 81 in other of the holes 80 and 83 in the arms 20 and 82, the ratio of the angular displacement of the ground wheel 2 to the angularly displacement of the ground wheel 4 can be altered.

In the working position shown in Figure 2, the device is to be moved in the direction of the arrow R, which is substantially opposite to the direction V and the device is converted from the position shown in Figure 1 to that shown in Figure 2, by turning the rake wheels 25 to 28 about their oblique shafts 21 to 24 and by turning the seat 72 about the shaft 68. In order to move the machine in the direction R, it is only necessary to apply the tractive force on the draw hook 11, instead of on the draw hook 85. Since the ground wheels 2 and 4 are coupled to one another, there is no need for separate locking means to be provided for each of the wheels 2 and 4.

The relative positions of the ground wheels 2 and 4 may be changed by releasing the locking pin 16, by turning the arm 14 with respect to the segment 12 and by re-introducing the locking pin 16 into a different hole 13. Thus the ground wheels can be made to occupy another position, in which they also lie in parallel planes, so that it is possible to vary the angle between the rake wheels and the direction of movement.

What we claim is:

1. An agricultural device comprising a mobile frame, rake wheels on said frame, running wheels pivoted on said frame and supporting the latter, means coupling said running wheels so that the latter are adapted to pivot simultaneously in opposite rotary directions after said device deviates from a straight path, and draw means coupled to one of said running wheels for drawing said frame.

2. A device as claimed in claim 1 wherein the first said means includes interconnected rods and levers to pivot the running wheels in opposite directions.

3. A device as claimed in claim 1 wherein the rake wheels are pivoted on said frame.

4. A device as claimed in claim 1 further including a freely pivotable caster wheel on said frame.

5. A device as claimed in claim 1 further including draw means on another of said running wheels.

6. A device as claimed in claim 1 further including a seat on the frame pivotable through at least one-hundred and eighty degrees.

7. A device as claimed in claim 1 further including vertical shafts on the frame connected to the running wheels, a further shaft on said frame, the first said means including rods and levers connecting the shafts and thus connecting the running wheels.

8. A device as claimed in claim 1, comprising means operatively associated with the first said means for locking one of said running wheels in different positions with regard to the first said means.

9. A device as claimed in claim 2, wherein one of the rods is adjustably coupled to one of the levers.

References Cited in the file of this patent

UNITED STATES PATENTS

| | | |
|---|---|---|
| 1,731,558 | Wright | Oct. 15, 1929 |
| 2,028,332 | Johnson | Jan. 21, 1936 |
| 2,559,379 | Szekely | July 3, 1951 |
| 2,662,782 | Wilson | Dec. 15, 1953 |
| 2,761,692 | Sisulak | Sept. 4, 1956 |
| 2,763,493 | Hutchinson | Sept. 18, 1956 |

FOREIGN PATENTS

| | | |
|---|---|---|
| 680,537 | Great Britain | Oct. 8, 1952 |
| 183,983 | Austria | Dec. 10, 1955 |
| 1,120,552 | France | Apr. 23, 1956 |